United States Patent
Frances et al.

[11] Patent Number: 5,795,947
[45] Date of Patent: Aug. 18, 1998

[54] OLEFINICALLY FUNCTIONAL POLYORGANOSILOXANES AND CURABLE SILICONE COMPOSITIONS COMPRISED THEREOF

[75] Inventors: Jean-Marc Frances, Villeurbanne; Andre Soldat, Lyon, both of France

[73] Assignee: Rhone-Poulenc Chimie, Courbevoie Cedex, France

[21] Appl. No.: 678,174

[22] Filed: Jul. 11, 1996

Related U.S. Application Data

[63] Continuation of Ser. No. 267,749, Jul. 5, 1994, abandoned.

[30] Foreign Application Priority Data

Jul. 2, 1993 [FR] France ............... 93 08115

[51] Int. Cl.$^6$ .................................. C08G 77/08
[52] U.S. Cl. ................... 528/15; 528/31; 528/32; 525/478
[58] Field of Search .............. 528/15, 31, 32; 428/447; 525/478

[56] References Cited

U.S. PATENT DOCUMENTS

| | | | |
|---|---|---|---|
| 5,073,422 | 12/1991 | Konno et al. | 528/31 |
| 5,162,480 | 11/1992 | Schilling, Jr. et al. | 528/31 |
| 5,204,437 | 4/1993 | Ikeno et al. | 528/31 |
| 5,206,328 | 4/1993 | Okamura et al. | |
| 5,256,754 | 10/1993 | Takarada et al. | 528/31 |
| 5,332,796 | 7/1994 | Yoshikawa et al. | 528/15 |

FOREIGN PATENT DOCUMENTS

| | | |
|---|---|---|
| 0097333 | 1/1984 | European Pat. Off. |
| 0336854 | 10/1989 | European Pat. Off. |
| 0444960 | 9/1991 | European Pat. Off. |
| 0454130 | 10/1991 | European Pat. Off. |
| 0469890 | 2/1992 | European Pat. Off. |
| 0484119 | 5/1992 | European Pat. Off. |
| 0484120 | 5/1992 | European Pat. Off. |
| 0490401 | 6/1992 | European Pat. Off. |

Primary Examiner—Melvyn I. Marquis
Attorney, Agent, or Firm—Burns, Doane, Swecker & Mathis, L.L.P.

[57] ABSTRACT

Functional mixed polyorganosiloxanes, well suited for formulation into curable release compositions, notably for paper, comprise the same or different recurring structural units of the formula (I):

$$R_a Y_b X_c SiO_{(4-a-b-c)/2} \qquad (I)$$

in which the radicals R are each an alkyl, vinyl, aryl or aralkyl radical, at least 80% of the radicals R being methyl radicals, the radicals X are each H or a reactive polar functional group devoid of the heteroatoms nitrogen and sulfur, the radicals Y are at least $C_4$ alkenyl or alkenyloxy radical containing at least one site of ethylenic unsaturation at a polymer chain end or along the polymer chain, a, b and c are equal to 0, 1, 2 or 3, and a+b+c=0, 1, 2 or 3, with the proviso that the number of $SiO_{4/2}$ units is less than 30 mol %, and are prepared from the corresponding organohydropolysiloxanes devoid of the X functional groups and the Y radicals, from the corresponding alkenes from which the alkenyl or alkenyloxy radicals Y are derived and from the corresponding ethylenically or hydroxylated organic compounds from which the X functional groups are derived, whether via simultaneous or successive addition reactions, or via simultaneous dehydrocondensation and addition reactions, or via successive dehydrocondensation and then addition reactions.

17 Claims, No Drawings

– 1 –

OLEFINICALLY FUNCTIONAL POLYORGANOSILOXANES AND CURABLE SILICONE COMPOSITIONS COMPRISED THEREOF

This application is a continuation of application Ser. No. 08/267,749, filed Jul. 5, 1994 and now abandoned.

BACKGROUND OF THE INVENTION

1. Field of the Invention

The present invention relates to novel mixed silicone polymers containing olefinic functional groups and reactive polar functional groups, to a process for the preparation of such novel polymers and to curable release compositions comprised thereof.

2. Description of the Prior Art

Polyorganosiloxanes substituted by alkenyl or alkenyloxy radicals, useful for release paper applications, are described in U.S. Pat. No. 4,347,346, EP-A-219,720, EP-A-454,130 and EP-A-523,660.

Mixed polyorganosiloxanes substituted by vinyl and epoxy groups, useful as adherence agents for vulcanizable silicone compositions, are described in EP-A-336,854.

SUMMARY OF THE INVENTION

A major object of the present invention is the provision of novel mixed polyorganosiloxanes containing olefinic functional groups, particularly useful for release paper applications, whether as base polymers or as adhesiveness modifiers or, more generally, as constituents of silicone elastomer compositions.

Curable compositions including the subject mixed polyorganosiloxanes containing olefinic functional groups present the advantage of crosslinking very quickly at a temperature close to ambient temperature and of having an easily modifiable nonadherent, or anti-stick, nature.

Briefly, the present invention features novel mixed polyorganosiloxanes comprising:

(a) identical or different recurring structural units of the formula (I):

in which the radicals R, which may be identical or different, are each a $C_1$–$C_{18}$ alkyl radical, a vinyl radical, a $C_6$–$C_{12}$ aryl or aralkyl radical optionally substituted by halogen (especially fluorine) atoms, at least 80 mol % of the radicals R being methyl radicals; the radicals X, which may be identical or different, are each a hydrogen atom or a reactive polar functional group devoid of the heteroatoms nitrogen and sulfur, i.e., a reactive polar functional group bonded to silicon via an Si—C or Si—O—C linkage; the radicals Y, which may be identical or different, are each a linear or branched, at least $C_4$, preferably $C_4$–$C_{12}$ alkenyl or alkenyloxy radical bonded to silicon by an Si—C bond, namely, an alkenyl or alkenyloxy radical containing at least one site of ethylenic unsaturation at the end of a polymer chain and/or along the polymer chain; a, b and c are equal to 0, 1, 2 or 3; and a+b+c+0, 1, 2 or 3; with the proviso that the proportion of $SiO_{4/2}$ units is less than 30 mol %;

(b) optionally, recurring structural units of the formula (II):

in which Y′ is a polyvalent radical prepared by hydrosilylation of at least one ethylenic double bond in the radical Y;

and n is equal to the valency of the radical Y′; with the proviso that the number of units of formula (II) per molecule is lower than 1 when X is $C_1$–$C_4$ alkoxy functional group, with Y denoting an alkenyl residue; and (c) optionally, and preferably less than 20 mol %, of recurring structural units of formula (III):

in which Y″ is a monovalent radical isomeric with the radical Y; and with the proviso that the number of units of formula (I) in which the silicon atom is substituted by a functional group X and/or a radical Y and of units of formula (II) in which the silicon atom is substituted by a functional group X is such that said polyorganosiloxanes contain (i) at least 0.1 mol %, preferably from 0.5% to 5 mol %, of X functional groups, and (ii) at least 0.1 mol %, preferably from 1.5% to 10 mol %, of Y radicals.

DETAILED DESCRIPTION OF BEST MODE AND PREFERRED EMBODIMENTS OF THE INVENTION

More particularly according to the present invention, methyl, ethyl, octyl, trifluoropropyl, vinyl, phenyl and similar radicals are exemplary radicals R.

By "reactive polar functional group" is intended any polar functional group reactive either chemically by hydrolysis, esterification, condensation, polycondensation, addition, polyaddition, etc., or by dipole interaction.

Exemplary reactive polar functional groups X include the hydro functional group; and groups containing from 1 to 20 carbon atoms of the following type:

(i) hydroxyfunctional groups, such as 3-hydroxypropyl, 3-(2-hydroxyethoxy)propyl, etc., radicals, (ii) epoxyfunctional groups, such as 3-glycidoxypropyl, 4-ethanediyl (1,2-epoxycyclohexy), etc., radicals, (iii) alkoxyfunctional groups, such as methoxy, ethoxy, butoxy, octyloxy, etc., radicals;

(iv) aryloxyfunctional groups, such as phenyloxy, etc., radicals;

(v) acyloxyfunctional groups, such as acetoxy, etc., radicals, (vi) alkenylcarbonyloxyfunctional groups, such as acrylyloxy, methacrylyloxy, etc., radicals, (vii) trialkoxysilylfunctional groups, such as —$CH_2$—$CH_2$—Si—$(OC_2H_5)_3$, etc., radicals.

Exemplary radicals Y include 3-butenyl, 5-hexenyl, 9-decenyl, 10-undecenyl, 5,9-decadienyl, 6,11-dodecadienyl, allyloxypropyl radicals, and the like.

The functional group X and the radicals Y, Y′ or Y″ are preferably not borne by the same silicon atom.

The mixed polyorganosiloxanes according to the present invention may be linear polymers which may optionally contain up to 50% by weight of branching (structural units other than "D" units), cyclic polymers or three-dimensional polymers (resins).

The latter can be prepared from chlorosilanes or alkoxysilanes bearing the X functional group and from chlorosilanes or alkoxysilanes bearing the Y residue, by cohydrolysis, polycondensation and polymerization of the hydrolysis products in the presence of cyclic diorganosilanes, or redistribution in the presence of polydiorganosiloxanes of high molecular weight.

The mixed polyorganosiloxanes of the invention are preferably prepared from:

(i) corresponding organohydropolysiloxanes (H) which are devoid of X functional groups and Y residues;

(ii) alkene(s) (Ψ) containing at least two sites of olefinic unsaturation, from which the alkenyl or alkenyloxy residue(s) Y is(are) derived; and (iii) the ethylenically unsaturated or hydroxylated organic compound(s) (Ξ) from which the functional group(s) X (nonhydro) is(are) derived.

The mixed polyorganosiloxanes of the invention, containing nonhydro functional group X can thus be prepared by simultaneous or successive addition (hydrosilylation) reactions or by simultaneous dehydrocondensation and addition (hydrosilylation) reactions, or by successive dehydrocondensation and then addition (hydrosilylation) reactions. Starting from the corresponding organohydropolysiloxanes (H) devoid of X functional groups and Y residues, from the alkene(s) (Ψ) containing at least two sites of olefinic unsaturation, from which the alkenyl or alkenyloxy residue (s) Y is(are) derived, and from the ethylenically unsaturated or hydroxylated organic compound(s) (Ξ) from which the functional group(s) X is(are) derived, when a proportion of structural units of formula (II) which is less than 1 per molecule is desired, it is preferable that the ethylenically unsaturated or hydroxylated organic compound(s) (Ξ) should react with the SiH functional groups of the organohydropolysiloxane (H) prior to reaction with the alkene(s) (Ψ).

These hydrosilylation and dehydrocondensation reactions can be carried out at a temperature on the order of 15° to 200° C., preferably on the order of 20° to 100° C., in the presence of a catalyst based on a metal of the platinum group. The platinum derivatives and complexes which are described in U.S. Pat. Nos. 3,715,334, 3,775,452, 3,814,730, 3,159,601 and 3,159,662 are particularly illustrative thereof.

The amounts of catalyst which are used are on the order of 1 to 300 parts per million, expressed as metal, relative to the reaction mixture.

In the definition of the "mole of (Ψ)," the site of olefinic unsaturation capable of reacting with (H) by hydrosilylation will be considered to be the elementary unit.

Similarly, in the definition of the "mole of (Ξ)," the site of olefinic unsaturation or the OH functional group capable of reacting with (H) by hydrosilylation or dehydrocondensation will be considered to be the elementary unit.

The amounts of reactants that can be used generally correspond to a molar ratio [(Ξ)+(Ψ)]/SiH [of H] either on the order of 0.5 to 30, preferably on the order of 2.5 to 10; when a proportion of structural units of formula (II) per molecule which is lower than 1 is desired, it is preferable that the molar ratio of reactive (Ψ)/SiH [of H] not reacted with (Ξ) is greater than 5 and very particularly greater than 7.

The mixed polyorganosiloxanes containing hydro X functional groups may be prepared by partial hydrosilylation reaction from the alkene(s) (Ψ) and from the corresponding organohydropolysiloxanes (H) which are devoid of said Y residue, it being possible for the molar ratio of SiH [of (H)]/(Ψ) to be on the order of 0.01 to less than 8, preferably on the order of 0.1 to 4. The hydrosilylation operation can be carried out in the presence of a catalyst based on a supported metal of the platinum group as described in EP-A-151,991, said catalyst being removed from the reaction mixture when the desired degree of conversion of the hydrosilyl groups is attained.

When linear polymers are included, these consist essentially of structural units "D" $R_2SiO_{2/2}$, $RXSiO_{2/2}$, $R_2YSiO_{2/2}$ and "M" $R_3SiO_{1/2}$ or $R_2YSiO_{1/2}$, $R_2XSiO_{1/2}$; the blocking endgroup "M" structural units may be trialkylsiloxy, dialkylarylsiloxy, dialkylvinylsiloxy or dialkylalkenylsiloxy radicals. Exemplary of the endgroup "M" units are trimethylsiloxy, dimethylphenylsiloxy, dimethylvinylsiloxy, dimethylhexenylsiloxy, dimethylethoxysiloxy, dimethylethyltriethoxysilylsiloxy radicals, etc.

Exemplary "D" structural units include dimethylsiloxy, methylphenylsiloxy, methylvinylsiloxy, methylbutenylsiloxy, methylhexenylsiloxy, methyldecenylsiloxy, methyldecadienylsiloxy, methyl-3-hydroxypropylsiloxy, methyl-3-glycidoxypropylsiloxy, methyl-2-(3',4'-epoxycyclohexyl) ethylsiloxy, methylbutoxysiloxy, methyl-β-trimethoxysilylethylsiloxy and methyl-β-triethoxysilylethylsiloxy radicals.

The linear mixed polyorganosiloxanes may be oils having a dynamic viscosity on the order of 1 to 100,000 mPa.s at 25° C., generally on the order of 10 to 5,000 mPa.s at 25° C., or resins which have a molecular weight on the order of 1,000,000.

When cyclic mixed polyorganosiloxanes are included, these comprise "D" structural units $R_2SiO_{2/2}$, $RXSiO_{2/2}$ and $RYSiO_{2/2}$, which may be of the dialkylsiloxy, alkylarylsiloxy, alkylvinylsiloxy, alkylysiloxy or alkylxsiloxy type; examples of such structural units are indicated above.

The cyclic mixed polyorganosiloxanes have a viscosity on the order of 1 to 5,000 mPa.s.

The dynamic viscosity at 25° C. of the silicone polymers can be measured using a Brookfield viscometer according to AFNOR NFT Standard 76 102 of February 1972.

When polyorganosiloxane resins are included, these comprise at least two types of different siloxy units, namely, "M" units and "Q" ($SiO_2$) units and/or "T" and optionally "D" units. The ratio of the number of "M" units/number of "Q" and/or "T" units ranged from 4/1 to 0.5/1, and the ratio of the number of "D" units/number of "Q" and/or "T" units ranged from 100/1 to 0.

The resins preferably have an O/Si molar ratio higher than 0.75; when this ratio is less than 1 the resins are generally liquid. More viscous products have an O/Si ratio close to 1; solid resins which are thermoplastic or which have a high softening point are obtained when such ratio is greater than 1.

The "M" structural units are essentially those indicated above; the "T" structural units consist essentially of the groups $RSiO_{3/2}$, $XSiO_{3/2}$ and $YSiO_{3/2}$, such as methylsiloxy, vinylsiloxy, phenylsiloxy, butenylsiloxy, hexenylsiloxy, decenylsiloxy, decadienylsiloxy, 3-hydroxypropylsiloxy, 3-glycidoxypropylsiloxy, 2-(3',4'-epoxycyclohexylsiloxy, 3-(2-hydroxyethoxy)propyl)siloxy, methoxysiloxy, butoxysiloxy, phenyloxysiloxy, acetoxysiloxy, acryloxysiloxy, β-(triethoxysilyl)ethylsiloxy radicals, etc. The "D" structural units are essentially those indicated above.

Although the novel polymers of the invention consist essentially of the aforesaid siloxy units, the optional presence of trace amounts of silanol units (less than 20% by weight) is also within the ambit hereof.

The present invention also features the curable release compositions including the mixed polyorganosiloxanes described above.

According to the invention, the curable release compositions contain:

(i) (100–x) parts by weight of a base "Si alkenyl" polydiorganosiloxane (A) selected from among linear or cyclic polydiorganosiloxanes (A1) blocked by triorganosiloxane endgroups, the organic radicals being $C_1-C_{18}$ alkyl or cycloalkyl, $C_2-C_{20}$, preferably $C_2-C_{12}$ alkenyl, $(C_3-C_9)$alkenyloxy$(C_2-C_4)$alkylene or phenyl radicals, at least 80 mol % of said radicals being methyl radicals, at least 0.1 mol %, preferably from 0.5 to 5 mol % of said organic radicals, which may be identical or different, being alkenyl or alkenyloxyalkylene radicals bonded directly to silicon ("Si alkenyl"); and/or linear or cyclic mixed polydiorganosiloxanes (A2) containing structural units of formulae (I), (II) and optionally (III) above, mixed polydiorganosiloxanes consisting essentially of "D" and "M" structural units, said polyorganosiloxane (A) being optionally diluted in a solvent for silicone polymers;

(ii) a polyorganohydrosiloxane crosslinking agent (B) selected from among linear or cyclic polyorganohydrosiloxanes (B1) containing from 1.6% to 0.9 mol % of hydrogen atoms bonded directly to silicon ("SiH") at polymer chain end(s) and/or along the polymer chain, the identical or different organic radicals being $C_1-C_{18}$ alkyl or phenyl radicals, at least 80 mol % of said organic radicals being methyl radicals; and/or polyorganohydrosiloxane resins (B2) comprising $R_2HSiO_{1/2}$, $RSiO_{3/2}$ and/or $SiO_2$ structural units, the organic radicals R, which are identical or different, being $C_1-C_{18}$ alkyl or phenyl radicals, at least 80 mol % of said organic radicals being methyl radicals; the crosslinking agent (B) being optionally diluted in a solvent for silicone polymers;

(iii) optionally, a hydrosilylation-inhibiting agent (C);

(iv) an effective amount of a hydrosilylation catalyst (D);

(v) x parts by weight of an adhesiveness-modulating polyorganosiloxane mixed resin (F) containing structural units of formulae (I), (II) and optionally (III) above, said mixed resin comprising at least two different types of siloxy units, namely, "M" units and "Q" and/or "T" units and optionally "D" units, the ratio of the number of "M" units/number of "Q" and/or "T" units ranging from 4/1 to 0.5/1, the ratio of the number of "D" units/number of "Q" and/or "T" units ranging from 100/1 to 0, with the proviso that the value of x may range from 1 to 100, preferably from 5 to 95 and very preferably from 10 to 50 when the polydiorganosiloxane (A) includes the polydiorganosiloxane (A1), or from 0 to 100, preferably from 0 to 95 and most preferably from 0 to 50, when the polydiorganosiloxane (A) includes the mixed polymer (A2), the modulating resin (F) optionally being diluted or dissolved in a solvent for silicone polymers. The amount of crosslinking agent (B) is such that, in the curable compositions, the ratio of the number of moles of "SiH" originating, especially, from the crosslinking agent (B) and optionally from the solvents for silicone polymers/number of moles of "Si alkenyl" originating, especially, from the polyorganosiloxane (A), optionally from the solvents for silicone polymers and from the modulating resin (F) when it is present, is higher than 1, preferably on the order of 1.1 to 1.6.

The linear or cyclic polydiorganosiloxane containing "Si alkenyl" functional groups (A) has a viscosity of at least 50 mPa.s, generally on the order of 150 to 1,000 mPa.s. The vinylated oils (A1) are commercially available and are usually employed for preparing curable release compositions (U.S. Pat. No. 4,623,700); those containing heavier alkenyl or alkenyloxyalkylene groups (A1) are described in EP-B-219,720 and EP-A-454,130.

The following are exemplary solvents or diluents for silicone polymers:

(1) conventional hydrocarbon solvents for silicone resins, solvents of aromatic type (xylene, toluene, etc), of saturated aliphatic type (hexane, heptane, white spirit, tetrahydrofuran, diethyl ether, etc.), chlorinated solvents (methylene chloride, perchloroethylene, etc.).

These are generally employed in an amount corresponding to 50–70 parts by weight per 30–50 parts by weight of silicone polymer;

(2) so-called "reactive" solvents such as
  (a) liquid organopolysiloxane resins in which the organic radicals are $C_1-C_{18}$ alkyl or cycloalkyl, $C_2-C_{20}$, preferably $C_2-C_{12}$ alkenyl radicals which have a ratio of the number of "M" units/number of "Q" and/or "T" units on the order of 1 to 4 and, optionally, from 1 to 5 "D" units per 100 moles of liquid resin, and containing from 0.5% to 5 mol % of alkenyl functional groups bonded to silicon ("Si alkenyl") or of hydrogen atoms bonded to silicon ("SiH"); these resins have a viscosity at 25° C. which is less than 100 mPa.s, preferably on the order of 2 to 50 mPa.s.

These liquid resins are known materials; they are described, especially, in U.S. Pat. No. 4,707,531 and European Application EP-A-389,138;

and/or (b) fluid organopolysiloxane oils in which the organic radicals are $C_1-C_{18}$ alkyl or cycloalkyl, $C_2-C_{20}$ alkenyl or $(C_3-C_9)$alkenyloxy$(C_2-C_4)$alkylene radicals, oils containing from 0.2% to 5 mol % of alkenyl or alkenyloxyalkylene functional groups bonded to silicon, at polymer chain end(s) or along the polymer chain, said oils having a viscosity less than 200 mPa.s;

and/or (c) hydrocarbons containing sites of olefinic unsaturation(s), such as $C_{14}-C_{18}$ olefins, dibutyl maleate, decyl vinyl ether, dodecyl vinyl ether, camphene, meta-bisisopropenylbenzene, etc.

The so-called "reactive" solvents are generally employed in an amount corresponding to 20–50 parts by weight per 80–50 parts by weight of silicone polymer;

(3) aqueous emulsions of nonionic surface-active agents (polyvinyl alcohol, polyethoxylated alkylphenols, oxyethylenated fatty alcohol ethers, etc.) generally containing on the order of 1%–3% by weight of surface-active agent. These are generally employed in a proportion of 40–70 parts by weight per 60–30 parts by weight of silicone polymer.

The crosslinking agent containing "SiH" functional groups (B) has a viscosity which is lower than 200 mPa.s, preferably on the order of 5 to 150 mPa.s. Exemplary of such crosslinking agents are those described in U.S. Pat. No. 4,623,700, European Patent EP-B-219,720 and U.S. Pat. Nos. 4,726,964 and 3,436,366.

Exemplary catalysts are the well-known derivatives and complexes of metals such as platinum, rhodium, ruthenium, etc. Specific examples of these catalysts are set forth in U.S. Pat. Nos. 3,159,601, 3,159,662, 3,220,972, 3,715,334, 3,775,452, 3,814,730, 3,296,291 and 3,928,629, and French Patents FR-A-1,313,846 and 1,480,409. They are generally employed in an amount on the order of 5 to 500 parts by weight, expressed as metal, per million parts by weight of reactive silicone polymers.

The hydrosilylation-inhibiting agent is present in an amount such that it inhibits the action of the catalyst at ambient temperature, this inhibitatory action ceasing during the crosslinking treatment at increased temperature; this amount is generally on the order of 0.01 to 1 part by weight, preferably on the order of 0.1 to 0.25 part by weight, per 100 parts of the total weight of silicone.

Exemplary such inhibitors are dialkyl dicarboxylates (U.S. Pat. Nos. 4,256,870 and 4,476,166), dialkyl acetylene-dicarboxylates (U.S. Pat. No. 4,347,346), acetylenic alcohols (U.S. Pat. Nos. 3,989,866, 4,336,364 and 3,445,420), etc.

Other than the modulating resin (F) (or instead of the latter when the polydiorganosiloxane (A2) is employed as the base polymer), conventional modulators may be present, such as (i) organopolysiloxane modulator resins containing "Si alkenyl" functional groups, comprising at least two different types of "M", "Q" and/or "T" and, optionally, "D" siloxy recurring structural units, the organic radicals, which may be identical or different, are $C_1-C_{18}$ alkyl or cycloalkyl, $C_2-C_{20}$, preferably $C_2-C_{12}$ alkenyl or $(C_3-C_9)$alkenyloxy$(C_2-C_4)$alkylene radicals, at least 80 mol % of the organic radicals being methyl radicals, said resin containing at least 0.1 mol %, preferably from 0.5 to 5 mol %, of said identical or different alkenyl or alkenyloxyalkylene groups bonded to silicon ("Si alkenyl"), with a ratio of the number of "M" units/number of "Q" and/or "T" units of 0.6–1, the number of optional "D" units being 0.5–10 per 100 moles of resin;

(ii) organohydropolysiloxane modulator resins containing a "SiH" functional group, comprising at least two different types of "M", "Q" and/or "T" and, optionally "D" siloxy recurring structural units, the organic radicals, which may be identical or different, defined as in (i), at least 80 mol % of said radicals being methyl radicals, said resin containing at least 0.5 mol %, preferably from 0.5 to 5 mol %, of hydrogen atoms bonded directly to silicon ("SiH") with a ratio of number of "M" units/number of "Q" and/or "T" units of 0.6–1, the number of optional "D" units being 0.5–10 per 100 moles of resin, and said resins containing less than 10 mol %, preferably less than 0.5 mol % and more preferably, less than 0.3 mol % of silanol functional groups.

Modulator resins containing "Si alkenyl" functional groups, especially vinylated resins, are well known to this art; the alkenyl or alkenyloxy groups may be situated on the "M", "D" or "T" units. These can be prepared, for example, by the process described in U.S. Pat. No. 2,676,182 or by that described in U.S. Pat. No. 4,611,042. A treatment which is well known to the art, using a silazane, permits the content of remaining silanol functional groups to be decreased to less than 0.3% by weight, this being to prevent interfering condensation reactions. A certain number of these resins are available commercially, in most cases in the form of solutions, for example at a concentration of 40%–70% in a solvent such as toluene or xylene. Exemplary modulating resins containing "Si alkenyl" functional groups include:

(1) $MD^{Vi}Q$ where the vinyl groups are included in the "D" structural units;

(2) $MM^{Vi}Q$ where the vinyl groups are including in a fraction of the "M" structural units;

(3) $MD^{Vi}T$ where the vinyl groups are included in the "D" structural units;

(4) $MM^{Hexenyl}Q$ where the hexenyl groups are included in a fraction of the "M" structural units;

(5) $MM^{Allyloxypropyl}Q$ where the allyloxypropyl groups are included in a fraction of the "M" structural units.

Modulator resins containing "SiH" functional groups are also well known to this art and are described, especially, in U.S. Pat. No. 3,772,247. The hydrogen atoms thereof may be situated in the chain or at chain end(s). A certain number of these resins are available commercially, in most cases in the form of solutions, for example at a concentration of 40%–70% in a solvent such as toluene or xylene.

Exemplary modulator resins containing the "SiH" functional group include:

(1) MD'Q where the hydrogen atoms bonded to silicon are included in the "D" structural units;

(2) MM'Q where the hydrogen atoms bonded to silicon are included in a fraction of the "M" structural units;

(3) MM'DQ where the hydrogen atoms bonded to silicon are included in a fraction of the "M" structural units;

(4) MDT' where the hydrogen atoms bonded to silicon are included in the "T" structural units.

The subject curable release compositions can be formulated by mixing these various constituents. Certain conditions of introduction should be observed, namely, the introduction of the hydrosilylation inhibitor before that of the crosslinking agent, with the catalyst being added last.

The subject curable compositions are fluid at normal temperature. Their viscosity is generally on the order of 100 to 500 mPa.s at 25° C.

These can be applied using devices employed on industrial papercoating machines such as a five-roller coating head, systems with air-knives, with a leveller rod, etc., onto flexible substrates or materials, and then heat-cured, for example by means of infrared lamps, UV radiation or, preferably, by transport through tunnel ovens heated to 70°–200° C. The time of travel in these ovens is a function of the temperature; it is generally on the order of 5 to 15 seconds at a temperature on the order of 100° C. and on the order of 1.5 to 3 seconds at a temperature on the order of 180° C.

The subject compositions can be deposited onto any flexible material or substrate, such as papers of various types (supercalendered, coated, etc.), cardboards, cellulose sheets, metal sheets, plastic films, (polyester, polyethylene, polypropylene, etc.), etc.

The amounts of compositions which are deposited are on the order of 0.5 to 2 g per $m^2$ of area to be treated, which corresponds to the deposition of thin layers on the order of 0.5 to 2 μm in thickness.

The substrate thus coated may subsequently be adhered to any rubber, acrylic or other pressure-sensitive adhesive material. The adhesive material is then easily separated from the substrate.

In order to further illustrate the present invention and the advantages thereof, the following specific examples are given, it being understood that same are intended only as illustrative and in nowise limitative.

EXAMPLE 1

77 g (0.67 mol) of allyl glycidyl ether were introduced unto a 2-liter three-necked round bottom flask fitted with a central stirring system, followed by 191 g (2.33 mol) of 1,5-hexadiene and 0.116 g of a platinum complex containing 13.6% by weight of platinum complexed with 1,3-divinyl-1,1,3,3-tetramethyldisiloxane, as described in U.S. Pat. No. 3,715,334.

1,000 g of a polymethylhydrodimethylsiloxane oil, the properties of which were as follows, were then introduced into the reaction mixture at 20° C., at a rate of 16.7 $cm^3$/minute:

(i) $\overline{Mn}$=8,550;

(ii) 68.1 meq.H/100 g;

(iii) average structure:

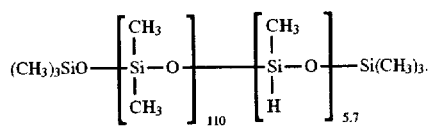

After 200 cm³ of oil had been introduced, the reactor was immersed in an oil bath preheated to 88° C. The temperature of the reaction medium reached 78° C.

After the additional 1 hour of reaction at 80° C., the degree of conversion of the hydrosilyl functional groups was complete.

The product was filtered on a "millipore" membrane (0.5 μm porosity). The reaction mass was fluid.

1,157 g of reaction product were recovered and were devolatilized for 5 hours at 150° C., at 2600 Pa.

961 g of heavy products and 191.3 g of volatile products were recovered, which corresponds to a weight balance of 99.6%.

The viscosity of the product was 478 mPa.s.

Iodine determination quantified the content of unsaturated functional groups (referred to as "Vi" below) in the oil obtained; it was 51.7 meq. "Vi"/100 g.

Analysis of the volatile products by vapor phase chromatography evidenced:

(1) a content of hexadiene and isomers thereof of 69% by weight;

(2) a content of allyl glycidyl ether and isomers thereof of 25.5% by weight;

(3) a cyclic siloxanes content of 5.5% by weight.

The following were therefore fixed:

(a) 42 g of hexadiene, i.e., 53.3 meq. "Vi"/100 g (calculated), (b) 21 g of allyl glycidyl ether, i.e., 19.2 meq. epoxy/100 g (calculated).

The content of structural units of formula (II) was approximately 0.15 functional group per molecule

EXAMPLE 2

64.7 g (0.34 mol) of vinyltriethoxysilane were introduced into a 2-liter three-necked round bottom flask fitted with a central stirring system, followed by 195.8 g (2.39 mol) of 1,5-hexadiene and 0.116 g of a platinum complex containing 13.6% by weight of platinum complexed with 1,3-divinyl-1,1,3,3-tetramethyldisiloxane, as described in U.S. Pat. No. 3,715,334.

1,000 g of polymethylhydrodimethylsiloxane oil of Example 1 were then introduced into the reaction mixture at 25° C. After 200 cm³ of oil had been introduced, the reactor was immersed in an oil bath to attain a temperature of 80° C. upon completion of addition of this reactant. The introduction of this oil required 68 minutes.

Reaction was then permitted to proceed for 1 hour; the degree of conversion of the hydrosilyl functional groups was 97%.

After an additional 30 minutes of reaction at 80° C., the degree of conversion of the hydrosilyl functional groups was complete.

1,143.5 g of product recovered after filtration were withdrawn, which product was devolatilized for 5 hours at 150° C., at 3500 Pa.

953 g of heavy products and 170.75 g of volatile products were recovered.

The viscosity of the product was 370 mPa.s at 22° C.

Iodine determination quantified the content of unsaturated functional groups in the oil obtained; it was 49.8 meq. "Vi"/100 g.

Analysis of the volatile products by vapor phase chromatography evidenced:

(1) a content of hexadiene and isomers thereof of 80.5% by weight;

(2) a content of vinyltriethoxysilane and isomers thereof of 14% by weight;

(3) a cyclic siloxanes content of 5.5% by weight.

The following were therefore fixed:

(a) 40.4 g of hexadiene, i.e., 51.7 meq. "Vi"/100 g (calculated), (b) 34.8 g of vinyltriethoxysilane, i.e., 19.2 meq./100 g (calculated).

The content of structural units of formula (II) was approximately 0.16 per molecule.

EXAMPLE 3

313 g (6.8 mol) of ethanol were introduced into a 2-liter three-necked round bottom flask fitted with a central stirring system, followed by 195.8 g (2.39 mol) of 1,5-hexadiene and 0.139 g of a platinum complex containing 13.6% by weight of platinum complexed with 1,3-divinyl-1,1,3,3-tetramethyldisiloxane, as described in U.S. Pat. No. 3,715,334.

1,000 g of polymethylhydrodimethylsiloxane oil of Example 1 were then introduced into the reaction mixture at 20° C., at a rate of 16.7 cm³/minute. After 200 cm³ of oil had been introduced, the reactor was immersed in an oil bath preheated to provide a temperature of 68° C. in the reaction mass upon completion of this addition.

Reaction was permitted to proceed for 1 hour; the degree of conversion of the hydrosilyl functional groups was 99%.

1,490 g of product recovered after filtration were withdrawn, which product was devolatilized for 5 hours at 150° C., at 3500 Pa.

1,027 g of heavy products and 450 g of volatile products were recovered.

The viscosity of the product was 460 mPa.s at 21° C.

Iodine determination quantified the content of unsaturated functional groups in the oil obtained; it was 50.6 meq. "Vi"/100 g.

Analysis of the volatile products by vapor phase chromatography evidenced:

(1) a content of hexadiene and isomers thereof of 25.7% by weight;

(2) an ethanol content of 67% by weight;

(3) a cyclic siloxanes content of 5.3% by weight.

The following were therefore fixed:

(a) 68.71 g of hexadiene, i.e., 56.23 meq. "Vi"/100 g (calculated), (b) 8 g of ethanol, i.e., 12 meq./100 g (calculated).

The content of structural units of formula (II) was approximately 0.5 per molecule.

EXAMPLE 4

84.4 g (0.68 mol) of 4-vinyl-1,2-epoxy cyclohexane were introduced into a 2-liter three-necked round bottom flask fitted with a central stirring system, followed by 196 g (2.38 mol) of 1,5-hexadiene and 0.117 g of a platinum complex containing 13.6% by weight of platinum complexed with 1,3-divinyl-1,1,3,3-tetramethyldisiloxane, as described in U.S. Pat. No. 3,715,334.

1.000 g of the polymethylhydrodimethylsiloxane oil of Example 1 were then introduced into the reaction mixture at 20° C., at a rate of 16.7 cm³/minute. After 200 cm³ of oil had been introduced, the reactor was immersed in an oil bath preheated to provide a temperature of 80° C. in the reaction mass upon completion of this addition after 1 hour.

Stirring was maintained for 1 hour and 30 minutes at 80° C.; the degree of conversion of the hydrosilyl functional groups was 100%.

The product was filtered on a "millipore" membrane (0.5 μm porosity). The reaction mass was fluid and clear.

1.267 g of product were withdrawn and devolatilized for 5 hours at 150° C., at 2600 Pa.

1,030.5 g of heavy products and 232 g of volatile products were recovered.

The viscosity of the product was 571 mPa.s at 21° C.

Iodine determination quantified the content of unsaturated functional groups in the oil obtained; it was 41.3 meq. "Vi"/100 g.

Analysis of the volatile products by vapor phase chromatography evidenced:

(1) a content of hexadiene and isomers thereof of 64.4% by weight;

(2) a 1,2-epoxy-4-vinylcyclohexane content of 29% by weight;

(3) a cyclic siloxanes content of 6.6% by weight.

The following were therefore fixed:

(a) 44.5 g of hexadiene, i.e., 52 meq. "Vi"/100 g (calculated), (b) 16.2 g of 1,2-epoxy-4-vinylcyclohexane, i.e., 12.7 meq./100 g (calculated).

The content of structural units of formula (II) was approximately 0.9 per molecule.

EXAMPLE 5

Into a 250-cc three-necked round bottom flask fitted with a central stirring system were introduced 60 mmol of 1,5-hexadiene and 120 mmol of allyl glycidyl ether and 0.625 mg of platinum in the form of a complex of platinum complexed with 1,3-divinyl-1,1,3,3-tetramethyldisiloxane, as described in U.S. Pat. No. 3,715,334.

The mixture was then heated to 40° C. with stirring under nitrogen and then 50 g of a methylhydropolysiloxane oil having a number-average molecular weight $\overline{Mn}=11{,}500$, containing α,ω-trimethylsilyl units at the ends of the polymer chain and containing 29.7 meq. of hydrosilyl units per 100 g were introduced over 10 minutes. During the introduction of the oil, the temperature was increased to 85° C. and reaction was permitted to proceed for approximately 8 hours. All of the hydrosilyl functional groups were converted. The oil obtained was then devolatilized in a vacuum of 130 Pa, at 70° C., and an oil with double functionality was obtained, in which the content of unsaturated functional groups, determined by iodimetry, was determined to be 17.2 meq. per 100 g of product and the content of epoxy functional groups, determined by potentiometry, was 35 meq. per 100 g of product. The viscosity of the oil obtained was 1,070 mPa.s.

The content of structural units of formula (II) was 2 per mole. Only trace amounts of structural units of formula (III) were determined.

EXAMPLE 6

The operating procedure of Example 1 was repeated, using 48 mmol of allyl glycidyl ether and 95 mmol of hexadiene for 3 hours at 86° C.

An oil was obtained whose dynamic viscosity at 25° C. was 2,450 mPa.s and which contained 27.5 meq. of unsaturated functional groups and 16 meq. of epoxy functional groups per 100 g of product.

The content of structural units of formula (II) was approximately 2.4 per mole; that of structural units of formula (III) was approximately 3 mol %.

EXAMPLE 7

7.223 g of hexadiene (i.e. 88 mmol) and 1.59 g of vinyltriethoxysilane (i.e., 8.36 mmol) were introduced into a 250-ml three-necked reactor. 1 mg of platinum was then added in the form of a solution containing 13.6% of Pt of a complex of platinum and 1,3-divinyl-1,1,3,3-tetramethyldisiloxane, as described in U.S. Pat. No. 3,715,334.

The mixture was then heated to 40° C. with stirring under nitrogen and then 50 g of a polydimethylmethylhydrosiloxane containing α,ω-trimethylsilyl units at the ends of the polymer chain and having a volatile content of 12.76% and a content of hydrogen bonded to a silicon atom of 67 meq./100 g were introduced over 50 min. The devolatilized polydimethylmethylhydrosiloxane oil used, analyzed by $^{29}$Si NMR, contained the following units "M": 1.3 mol % (trimethylsilyl)

"D": 94.1 mol % (dimethylsilyl)

"D'": 4.6 mol % (hydromethylsilyl).

Gel permeation chromatography indicated an average molecular weight of 10,200.

The reaction was permitted to proceed at 40° C. for 7 hours; an oil devoid of SiH functional groups was obtained which, after devolatilization at 70° C. at 130 Pa, evidenced:

(1) a dynamic viscosity at 25° C. of 3,160 mPa.s, (2) an olefinic functional group content of 52 meq./100 g of product.

$^{29}$Si and $^2$H NMR analysis revealed the structure:

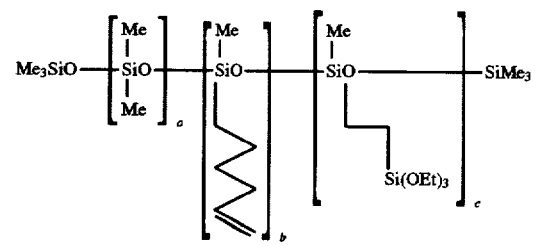

wherein a=131, b=5.8, and c=0.7.

The content of structural units of formula (II) was approximately 0.5 per mole; structural units of formula (III) were present in trace amounts.

EXAMPLE 8

31 g (0.68 mol) of ethanol were introduced into a 0.5-liter three-necked round bottom flask fitted with a central stirring system, followed by 39.2 g (0.95 mol) of 1,5-hexadiene and 3.37 mg of a platinum in the form of chloroplatinic acid in solution in isopropanol at a concentration of 7.7% by weight (i.e., 43.7 mg of solution).

200 g of the polymethylhydrodimethylsiloxane oil of Example 1 were then introduced after the reaction mass had been heated to 50° C. The time period of introduction was 68 min; upon completion of this addition the temperature was 54° C.

Reaction was permitted to proceed for 1 hour; the degree of conversion of the hydrosilyl functional groups was 94.5%.

A clear polymer was obtained which was devolatilized to remove the excess of unreacted ethanol and hexadiene.

264 g of product were withdrawn and devolatilized. 201 g of heavy products and 61.7 g of volatile products were recovered.

The viscosity of the product was 200 mPa.s at 21° C.

Iodine determination quantified the content of unsaturated functional groups in the oil obtained; it was 19.7 meq. "Vi"/100 g.

Analysis of the volatile products by vapor phase chromatography with an internal standard (undecane) evidenced:

(1) a content of hexadiene and isomers thereof of 55.1% by weight;

(2) an ethanol content of 43.2% by weight;

(3) a cyclic siloxanes content of 0.7% by weight.

The following were therefore fixed:

(a) 4.4 g of hexadiene, i.e., 25.8 meq. "Vi"/100 g (calculated).

(b) 3.65 g of ethanol, i.e., 38.1 meq./100 g (calculated).

The content of structural units of formula (II) was approximately 0.5 per molecule.

EXAMPLE 9

The operating procedure of Example 8 was repeated in a 0.25-liter three-necked round bottom flask by introducing 3.1 g (68.1 mmol) of ethanol and then 19.6 g (0.47 mol) of 1,5-hexadiene and 19.73 mg of platinum solution in the form of chloroplatinic acid in solution (at a concentration of 7.71% by weight of platinum) in isopropanol.

100 g of the polymethylhydrodimethylsiloxane oil of Example 1 were then introduced after the reaction mass had been heated to 50° C.

The volume of gaseous hydrogen evolved was 165 cm$^3$ after an additional one hour of reaction and 280 cm$^3$ after 2 hours.

The degree of conversion of the SiH functional groups was 98%.

120 g of polymer were devolatilized and 102.7 g of heavy products and 14.6 g of volatile products were obtained.

The iodine determination of the unsaturated functional groups was 44.4 meq. "Vi"/100 g.

The proportion of ethoxy functional groups fixed according to the gas release observed was 12.5 meq. EtOH/100 g.

The content of structural units of formula (II) was approximately 0.85 functional group per molecule.

EXAMPLE 10

Into a 2-liter three-necked round bottom flask fitted with a central stirring system were introduced 255 g (3.1 mol) of 1,5-hexadiene and 0.102 g of a platinum complex containing 13.6% by weight of platinum complexed with 1,3-divinyl-1,1,3,3-tetramethyldisiloxane, as described in U.S. Pat. No. 3,715,334.

200 g of a polymethylhydrodimethylsiloxane oil, the properities of which were as follows, were then slowly introduced into the reaction mixture at 20° C. using a dropping funnel:

(i) dynamic viscosity: 198 mPa.s, (ii) 98.1 meq. H/100 g, (iii) average structure:

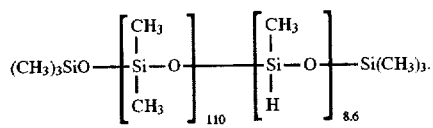

The reactor was immersed in an oil bath preheated to 80° C. and the 695 g of the same polymethylhydrodimethylsiloxane oil were added.

The mixture was maintained at 80° C. with stirring for 1 hour and the mixture was then permitted to slowly cool to ambient temperature.

The product was devolatilized for 3 hours at 70° C. at 400 Pa.

936 g of functionalized silicone oil were recovered.

Iodine determination quantified the unsaturated functional group content of the oil obtained; this was 79.8 meq. "Vi"/100 g.

The residual SiH content was 0.4 meq. H/100 g.

The content of structural units of formula (II) was approximately 1.6 functional groups per molecule.

50 g of the silicone oil containing hexenyl functional groups, prepared as above, and 200 g of dichloromethane were charged into a 500-ml three-necked round bottom flask fitted with mechanical stirring, a water condenser and a 50 ml dropping funnel.

The mixture was stirred and cooled to 2° C. A potassium acetate buffer (3.9 g) was added to a solution of peracetic acid at a concentration of 32% by weight in ethyl acetate (10.8 g).

This mixture was added to the reaction mixture over 30 min by means of the dropping funnel.

The ice bath was removed and the reaction mixture was maintained at ambient temperature with stirring for 17 h.

11 g of sodium bicarbonate and 12 g of anhydrous magnesium sulfate were then added; the solution was stirred vigorously for 10 min, was filtered, and the organic phase was washed with 250 ml of potassium hydroxide at a concentration of 4% in water. The organic phase was dried over 21 g of anhydrous magnesium sulfate and then filtered.

The solvent was evaporated off at reduced pressure (400 Pa) at a temperature of 70° C.

After devolatilization, an oil having the following characteristics was recovered:

(1) unsaturated functional group content: 49.8 meq. "Vi"/ 100 g (determined by iodometry), (2) epoxy functional group content: 28.5 meq. epoxy/100 g (potentiometric determination).

The yield of the oxidation stage was 30%.

EXAMPLE 11

The mixed diorganopolysiloxane oils prepared in Examples 1 to 4 were used as follows, in formulations destined for paper coating.

The following were introduced into 100 g of mixed diorganopolysiloxane oil:

(i) 0.15 of ethynylcyclohexanol as inhibitor, (ii) a polymethylhydrosiloxane oil containing approximately 1 mol % of SiH functional groups and having a dynamic viscosity of 25° C. of 100 mPa.s, in sufficient amount to provide a molar ratio of number of alkenyl functional groups/number of SiH functional groups on the order of 1.5.

After homogenizing, 90 part per million, expressed as platinum, of a platinum complex were added, which was prepared from chloroplatinic acid and 1,3-divinyl-1,1,3,3-tetramethyldisiloxane, as described in Example 1 of U.S. Pat. No. 3,814,730.

After homogenizing, the mixture was suitable for use.

From these mixtures, the following properties were examined:

(A) The reactivity of the mixed oils of the invention, on the one hand, by monitoring the change in the viscosity of the bath on a RAPRA VNC® (Vibrating Needle Curemeter) from RAPRA Technology; the time in minutes required to obtain gelling (determined using a needle vibrating in the bath at a frequency of approximately 40 Hz; measurement of the point of inflection in the curve of potential difference=f(time)) was measured in an oven heated at 70° C; and on the other, by evaluating the quality of the network by measuring the resonance frequency in Hz immediately after gelling (time T0);

(B) The coatability of the formulations prepared, by spreading these onto a paper substrate using a coating machine.

The apparatus employed was a Rotomec® pilot machine (marketed by Rotomec), equipped with a solvent-free head having five rolls.

The substrate employed was glassine paper, either of Sibille® 9564 type, marketed by Sibille, or of Kaemmerer® AV 100 type, marketed by Kaemmerer, the weight per unit area of which was on the order of 60 to 70 g/m².

The coating was carried out at a speed that was varied by the paper travel such as to obtain a coating quality whereby neither traces due to probing with a finger, nor migration (adhesive tape test) were observed any longer on the substrates sampled immediately on exiting the machines.

The quality of coating which was deposited was measured by X-ray fluorescence; it was on the order of 1 g/m2 of substrate.

(C) The behavior of the coated papers towards adhesives.

The coated papers obtained after 10 days of aging were placed in contact with the Tesa® 4970 (acrylic) adhesive tape marketed by Beiersdorf.

The composites formed were placed in a conditioned room (temperature of 23° C.±2° C.; relative humidity of 50%±5).

The quality of the coatings was evaluated by measuring the adhesion (or peeling strength), expressed in cN/cm according to the FINAT test No. 10 using an Instron® tensometer (marketed by Instron) with a peeling speed of 0.3 m/min.

The results obtained are reported in the following Table.

By way of comparison, the results obtained by replacing the mixed oils of the invention by the same amounts of the following oils are also reported:

(i) a polyorganosiloxane oil (Control 1) having the average structural formula:

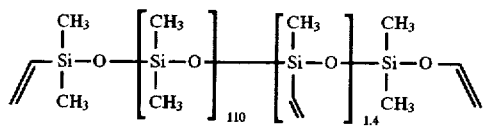

containing 1.1% of vinyl units by weight;

(ii) a polyorganosiloxane oil containing hexenyl functional groups (Control 2) and having the average structural formula:

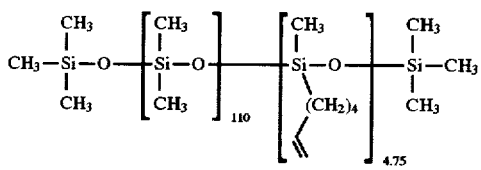

containing 1.43% by weight of hexenyl functional groups expressed as vinyl units.

Analysis of the results reported in the Table evidences that the use of mixed oils enables accelerating:

(a) the rate of reaction of the coating formulations, (b) the rate of coating.

The adhesion strengths are on the same order as those of a conventional system contining a vinyl functional group (Control 1) and better than those of a system containing a single hexenyl functional group (Control 2).

TABLE

| | Devolatilized oil | | Reactivity on VNC | | | | | |
|---|---|---|---|---|---|---|---|---|
| Example | Alkenyl functional group (mmol/ 100 g) | X functional group (mmol/ 100 g) | Viscosity (mPa.s) | Gel time (min) | Frequency at T0 (Hz) | Coating speed (m/min) | Adhesion strength (cN/cm) | Coating quality |
| 1 | hexenyl 52 | epoxy 19 | 480 | 12' | 185 | 160 | 15 | good |
| 2 | hexenyl 50 | ethyl-tri-ethoxy-silyl 19 | 370 | 11'30" | 175 | 200 | 13 | good |
| 3 | hexenyl 51 | ethoxy 12 | 460 | 10'30" | 190 | 200 | 14 | good |
| Control 1 | vinyl 40 | 0 | 200 | 30' | 120 | 140 | 14 | good |
| Control 2 | hexenyl 54 | 0 | 480 | 15' | 200 | 150 | 18 | good |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A functional mixed polyorganosiloxane comprising:

(a) identical or different recurring structural units of the formula (I):

$$R_aY_bX_cSiO_{(4-a-b-c)/2} \quad (I)$$

in which the radicals R, which may be identical or different, are each a $C_1$–$C_{18}$ alkyl radical, a vinyl radical, a $C_6$–$C_{12}$ aryl or aralkyl radical optionally substituted by halogen atoms, at least 80 mol % of the radicals R being methyl radicals;

wherein:
(i) the radicals X, which may be identical or different, are each a hydrogen atom or a reactive polar functional group devoid of the heteroatoms nitrogen and sulfur and bonded to silicon via an Si—C or Si—O—C linkage; and the radicals Y, which may be identical or different, are each a linear or branched, at least $C_{10}$ alkenyl or at least $C_4$ alkenyloxy radical bonded to silicon by an Si—C bond, said alkenyl or alkenyloxy radical containing at least one site of ethylenic unsaturation at the end of a polymer chain and/or along the polymer chain; or (ii) the radicals X, which may be identical or different, are each a hydrogen atom or a reactive polar functional group devoid of the heteroatoms nitrogen and sulfur and bonded to silicon via an Si—C or Si—O—C linkage, said polar functional groups being either hydrogen and/or groups containing from 1 to 20 carbon atoms selected from the group consisting of hydroxyfunctional groups, aryloxyfunctional groups, acyloxyfunctional groups, alkenylcarbonyloxyfunctional groups, and trialkoxysilylfunctional groups; and the radicals Y, which may be identical or different, are each a linear or branched, at least $C_4$ alkenyl or alkenyloxy radical bonded to silicon by an Si—C bond, said alkenyl or alkenyloxy radical containing at least one site of ethylenic unsaturation at the end of a polymer chain and/or along the polymer chain;

a, b and c are equal to 0, 1, 2 or 3; and a+b+c=0, 1, 2 or 3; with the proviso that the proportin of $SiO_{4/2}$ units is less than 30 mol %;

(b) optionally, recurring structural units of the formula (II):

$$Y'[SiR_aX_cO_{(4-a-c-1)/2}]_n \quad (II)$$

in which Y' is a polyvalent radical prepared by hydrosilylation of at least one ethylenic double bond in the radical Y; n is equal to the valency of the radical Y'; with the proviso that the number of units of formula (II) per molecule is lower than 1 when X is a $C_1$–$C_4$ alkoxy functional group, with Y being an alkenyl residue; and (c) optionally, recurring structural units of the formula (III):

$$R_aY''_bX_cSiO_{(4-a-b-c)/2} \quad (III)$$

in which Y" is a monovalent radical isomeric with the radical Y; with the proviso that the number of units of formula (I) in which the silicon atom is substituted by a functional group X and/or radical Y and of units of formula (II) in which the silicon atom is substituted by a functional group X is such that said mixed polyorganosiloxane contains (i) at least 0.1 mol % of X functional groups, and (ii) at least 0.1 mol % of Y radicals.

2. The functional mixed polyorganosiloxane as defined by claim 1, wherein formula (I), the radicals X are each a polar functional group reactive by hydrolysis, esterification, condensation, polycondensation, addition, polyaddition, or dipole interaction.

3. The functional mixed polyorganosiloxane as defined by claim 2, said radicals X comprising a hydrogen or hydroxyfunctional group, an epoxyfunctional group, an alkoxyfunctional group, an aryloxyfunctional group, an acyloxyfunctional group, an alkenylcarbonloxyfunctional group, or a trialkoxysilylfunctional group having from 1 to 20 carbon atoms.

4. The functional mixed polyorganosiloxane as defined by claim 1, wherein formula (I), the radicals R are each a methyl, ethyl, octyl, trifluoropropyl, vinyl or phenyl radical.

5. The functional mixed polyorganosiloxane as defined by claim 1, wherein formula (I), the radicals Y are each a 3-butenyl, 5-hexenyl; 9-decenyl, 10-undecenyl, 5,9-decadienyl, 6,11-dodecadienyl or allyloxypropyl radical.

6. The functional mixed polyorganosiloxane as defined by claim 1, up to 50% by weight thereof comprising branched, cyclic or three-dimensional polymers.

7. A curable silicone release composition comprising a functional mixed polyorganosiloxane comprising:

(a) identical or different recurring structural units of the formula (I):

$$R_aY_bX_cSiO_{(4-a-b-c)/2} \quad (I)$$

in which the radicals R, which may be identical or different, are each a $C_1$–$C_{18}$ alkyl radical, a vinyl radical, a $C_6$–$C_{12}$ aryl or aralkyl radical optionally substituted by halogen atoms, at least 80 mol % of the radicals R being methyl radicals; the radicals X, which may be identical or different, are each a hydrogen atom or a reactive polar functional group devoid of the heteroatoms nitrogen and sulfur and bonded to silicon via an Si—C or Si—O—C linkage; the radicals Y, which may be identical or different, are each a linear or branched, at least $C_4$ alkenyl or alkenyloxy radical bonded to silicon by an Si—C bond, said alkenyl or alkenyloxy radical containing at least one site of ethylenic unsaturation at the end of a polymer chain and/or along the polymer chain: a, b and c are equal to 0, 1, 2 or 3; and a+b+c=0, 1, 2 or 3; with the proviso that the proportion of $SiO_{4/2}$ units is less than 30 mol %;

(b) optionally, recurring structural units of the formula (II):

$$Y'[SiR_aX_cO_{(4-a-c-1)/2}]_n \quad (II)$$

in which Y' is a polyvalent radical prepared by hydrosilylation of at least one ethylenic double bond in the radical Y; n is equal to the valency of the radical Y'; with the proviso that the number of units of formula (II) per molecule is lower than 1 when X is a $C_1$–$C_4$ alkoxy functional group, with Y being an alkenyl residue; and (c) optionally, recurring structural units of the formula (III):

$$R_aY''_bX_cSiO_{(4-a-b-c)/2} \quad (III)$$

in which Y" is a monovalent radical isomeric with the radical Y; and with the proviso that the number of units of formula (I) in which the silicon atom is substituted by a functional group X and/or radical Y and of units of formula (II) in which the silicon atom is substituted by a functional group X is such that said mixed polyorpanosiloxane contains (i) at least 0.1 mol % of X functional groups, and (ii) at least 0.1 mol % of Y radicals.

8. The curable silicone release composition as defined by claim 7, said function al mixed polyorganosiloxane being adhesiveness modulating, and further comprising a base Si alkenyl polydiorganosiloxane, a polyorganohydrosiloxane crosslinking agent, and a catalytically effective amount of a hydrosilylation catalyst.

9. The curable silicone release composition as defined by claim 8, comprising:

(i) (100–x) parts by weight of a base Si alkenyl polydiorganosiloxane (A) selected from the group consisting of linear polydiorganosiloxanes blocked by triorganosiloxane endgroups and cyclic polydiorganosiloxanes (A1), the organic radicals being $C_1$–$C_{18}$ alkyl or cycloalkyl, $C_2$–$C_{20}$ alkenyl, ($C_3$–$C_9$) alkenyloxy ($C_2$–$C_4$)alkylene or phenyl radicals, at least 80 mol % of said radicals being methyl radicals, at least 0.1 mol % of said organic radicals, which may be identical or different, being alkenyl or alkenyloxyalkylene radicals bonded directly to silicon; and linear or cyclic mixed polydiorganosiloxanes (A2) which comprise structural units of the formulae (I), (II) and optionally (III), the mixed polydiorganosiloxanes consisting essentially of "D" and "M" structural units, wherein the "D" units are $R_2SiO_{2/2}$, $RXSiO_{2/2}$, $R_2YSiO_{2/2}$ or $RYSiO_{2/2}$, and the "M" units are $R_3SiO_{1/2}$, $R_2YSiO_{1/2}$ or $R_2XSiO_{1/2}$, said polyorganosiloxane (A) being optionally diluted in a solvent for silicone polymers;

(ii) a polyorganohydrosiloxane crosslinking agent (B) selected from the group consisting of linear and cyclic polyorganohydrosiloxanes (B1) containing from 1.6% to 0.9 mol % of hydrogen atoms bonded directly to silicon at polymer chain end(s) and/or along the polymer chain, the identical or different organic radicals being $C_1$–$C_{18}$ alkyl or phenyl radicals, at least 80 mol % of said organic radicals being methyl radicals; and polyorganohydrosiloxane resins (B2) comprising $R_2HSiO_{1/2}$, $RSiO_{3/2}$ and/or $SiO_2$ structural units, the organic radicals R, which are identical or different, being $C_1$–$C_{18}$ alkyl or phenyl radicals, at least 80 mol % of said organic radicals being methyl radicals; the crosslinking agent (B) being optionally diluted in a solvent for silicone polymers;

(iii) optionally, a hydrosilylation-inhibiting agent (C);

(iv) a catalytically effective amount of a hydrosilylation catalyst (D);

(v) x parts by weight of an adhesiveness-modulating polyorganosiloxane mixed resin (F) which comprises structural units of the formulae (I), (II) and optionally (III), said mixed resin comprising at least two different types of siloxy units selected from the group consisting of "M" units, "Q" units, and "T" units and optionally "D" units, wherein the "M" units are $R_3SiO_{1/2}$, $R_2YSiO_{1/2}$ or $R_2XSiO_{1/2}$, the "O" units are $SiO_2$, the "T" units are $RSiO_{3/2}$, $XSiO_{3/2}$ or $YSiO_{3/2}$, and the "D" units are $R_2SiO_{2/2}$, $RXSiO_{2/2}$, $R_2YSiO_{2/2}$ or $RYSiO_{2/2}$ the ratio of the number of "M" units/number of "Q" and/or "T" units ranging from 4/1 to 0.51, the ratio of the number of "D" units/number of "Q" and/or "T" units ranging from 100/1 to 0, with the proviso that the value of x ranges from 1 to 100 when the polydiorganosiloxane (A) includes the polydiorganosiloxane (A1), or from 0 to 100 when the polydiorganosiloxane (A) includes the mixed polymer (A2), the modulating resin (F) optionally being diluted or dissolved in a solvent for silicone polymers; with the proviso that the amount of crosslinking agent (B) is such that the ratio of the number of moles of SiH originating from the crosslinking agent (B) and optionally from the solvents for silicone polymers/number of moles of Si alkenyl originating from the polyorganosiloxane (A), optionally from the solvents for silicone polymers and from the modulating resin (F) when it is present, is higher than 1.

10. A process for the preparation of a functional mixed polyorganosiloxane comprising reacting an organohydropolysiloxane (H) which is devoid of radical Y and radical X as identified hereafter; with an alkene (Ψ) which is at least diolefinically unsaturated and from which the radical Y as identified hereafter is derived and with an ethylenically unsaturated or hydroxylated organic compound (Ξ) from which the radical X as identified hereafter is derived, such that a functional mixed polyorganosiloxane is produced which comprises:

(a) identical or different recurring structural units of the formula (I):

in which the radicals R, which may be identical or different, are each a $C_1$–$C_{18}$ alkyl radical, a vinyl radical, a $C_6$–$C_{12}$ aryl or aralkyl radical optionally substituted by halogen atoms, at least 80 mol % of the radicals R being methyl radicals;

wherein:

(i) the radicals X, which may be identical or different and are derived from said ethylenically unsaturated or hydroxylated organic compound (Ξ), are each a reactive polar functional group devoid of the heteroatoms nitrogen and sulfur and bonded to silicon via an Si—C or Si—O—C linkage; and the radicals Y which may be identical or different and are derived from the alkene (Ψ), are each a linear or branched, at least $C_{10}$ alkenyl or at least $C_4$ alkenyloxy radical bonded to silicon by an Si—C bond, said alkenyl or alkenyloxy radical containing at least one site of ethylenic unsaturation at the end of a polymer chain and/or along the polymer chain; or (i) the radicals X, which may be identical or different and are derived from said ethylenically unsaturated or hydroxylated organic compound (Ξ), are each a reactive polar functional group devoid of the heteroatoms nitrogen and sulfur and bonded to silicon via an Si—C or Si—O—C linkage, said solar functional groups being groups containing from 1 to 20 carbon atoms selected from the group consisting of hydroxyfunctional groups, aryloxyfunctional groups, acyloxyfunctional groups, alkenylcarbonyloxyfunctional groups, and trialkoxysilylfunctional groups; and the radicals Y, which may be identical or different and are derived from the alkene (Ψ), are each a linear or branched at least $C_4$ alkenyl or alkenyloxy radical bonded to silicon by an Si—C bond, said alkenyl or alkenyloxy radical containing at least one site of ethylenic unsaturation at the end of a polymer chain and/or along the polymer chain; a, b, c, and d are equal to 0, 1, 2 or 3; and a+b+c+d=0, 1, 2 or 3; with the proviso that the proportion of $SiO_{4/2}$ units is less than 30 mol %;

(b) optionally, recurring structural units of the formula (II):

$$Y'[SiR_aX_cO_{(4-a-c-1)/2}]_n \quad (II)$$

in which Y' is a polyvalent radical prepared by hydrosilylation of at least one ethylenic double bond in the radial Y; n is equal to the valency of the radical Y'; with the proviso that the number of units of formula (II) per molecule is lower than 1 when X is a $C_1$–$C_4$ alkoxy functional group, with Y being an alkenyl residue; and (c) optionally, recurring structural units of the formula (III):

$$R_aY''_bX_cSiO_{(4-a-b-c)/2} \quad (III)$$

in which Y" is a monovalent radical isomeric with the radical Y; and with the proviso that the number of units of formula (I) in which the silicon atom is substituted by a functional group X and/or radical Y and of units of formula (II) in which the silicon atom is substituted by a functional group X is such that said mixed polyorganosiloxane contains (i) at least 0.1 mol % of X functional groups, and (ii) at least 0.1 mol % of Y radicals.

11. The process as defined by claim 10, comprising simultaneous or successive addition reactions.

12. The process as defined by claim 10, comprising simultaneous dehydrocondensation and addition reactions.

13. The process as defined by claim 10, comprising successive dehydrocondensation and then addition reactions.

14. A flexible release substrate coated with the functional mixed polyorganosiloxane as defined by claim 1.

15. A flexible release substrate coated with the curable silicone release composition as defined by claim 8.

16. The flexible release substrate as defined by claim 15, said silicone release composition being in crosslinked elastomeric state.

17. A process for the preparation of a functional mixed polyorganosiloxane comprising partially hydrosilylating an organohydropolysiloxane (H) which is devoid of radical Y as identified hereafter, and the radical X is a hydrogen atom; with an alkene (Ψ) which is at least diolefinically unsaturated and from which the radical Y as identified hereafter is derived, with the proviso that the molar ratio SiH of said organohydropolysiloxane (H) to said alkene (Ψ) ranges from about 0.01 to less than 8, such that a functional mixed polyorganosiloxane is produced which comprises:

(a) identical or different recurring structural units of the formula (I):

$$R_aY_bX_cSiO_{(4-a-b-c)/2} \quad (I)$$

in which the radicals R, which may be identical or different, are each a $C_1$–$C_{18}$ alkyl radical, a vinyl radical, a $C_6$–$C_{12}$ aryl or aralkyl radical optionally substituted by halogen atoms, at least 80 mol % of the radicals R being methyl radicals; the radicals X are hydrogen; the radicals Y, which may be identical or different and are derived from the alkene (Ψ), are each a linear or branched, at least $C_4$ alkenyl or alkenyloxy radical bonded to silicon by an Si—C bond, said alkenyl or alkenyloxy radical containing at least one site of ethylenic unsaturation at the end of a polymer chain and/or along the polymer chain; a, b and c are equal to 0, 1, 2 or 3; and a+b+c=0, 1, 2 or 3:with the proviso that the proportion of $SiO_{4/2}$, units is less than 30 mol %;

(b) optionally, recurring structural units of the formula (II):

$$Y'[SiR_aX_cO_{(4-a-c-1)/2}]_n \quad (II)$$

in which Y' is a polyvalent radical prepared by hydrosilylation of at least one ethylenic double bond in the radial Y; n is equal to the valency of the radical Y'; with the proviso that the number of units of formula (II) per molecule is lower than 1 when X is a $C_1$–$C_4$ alkoxy functional group, with Y being an alkenyl residue; and (c) optionally, recurring structural units of the formula (III):

$$R_aY''_bX_cSiO_{(4-a-b-c)/2} \quad (III)$$

in which Y" is a monovalent radical isomeric with the radical Y; with the proviso that the number of units of formula (I) in which the silicon atom is substituted by a functional group X and/or radical Y and of units of formula (II) in which the silicon atom is substituted by a functional group X is such that said mixed polyorganosiloxane contains (i) at least 0.1 mol % of X functional groups, and (ii) at least 0.1 mol % of Y radicals.

* * * * *